United States Patent [19]
Perry

[11] Patent Number: 4,782,658
[45] Date of Patent: Nov. 8, 1988

[54] DEICING OF A GEARED GAS TURBINE ENGINE

[75] Inventor: Derick A. Perry, Derby

[73] Assignee: Rolls-Royce Plc, London, United Kingdom

[21] Appl. No.: 46,708

[22] Filed: May 7, 1987

[51] Int. Cl.⁴ .......................... F02K 3/02; F02G 3/00
[52] U.S. Cl. .............................. 60/226.1; 60/39.093; 60/39.08
[58] Field of Search .............. 60/39.093, 39.08, 226.1, 60/39.83; 416/171, 95, 170 R; 415/175, 177, 180; 184/6.11

[56] References Cited

U.S. PATENT DOCUMENTS

| | | | |
|---|---|---|---|
| 1,924,122 | 8/1933 | Jones | 60/39.093 |
| 2,507,044 | 5/1950 | Palmatier | 60/39.093 |
| 2,711,453 | 6/1955 | Leigh, Jr. | 60/39.093 |
| 2,712,727 | 7/1955 | Morley et al. | 60/39.093 |
| 3,834,157 | 9/1974 | Hoffmann | 60/39.093 |
| 3,981,466 | 9/1976 | Shah | 60/39.093 |
| 4,041,695 | 8/1977 | Harper et al. | 60/39.093 |
| 4,182,119 | 1/1980 | Hurley | 60/226.1 |

FOREIGN PATENT DOCUMENTS

| | | | |
|---|---|---|---|
| 0146487 | 6/1985 | European Pat. Off. | |
| 627396 | 8/1949 | United Kingdom | |
| 670366 | 4/1952 | United Kingdom | 60/39.093 |
| 949585 | 2/1964 | United Kingdom | 60/39.08 |
| 970207 | 9/1964 | United Kingdom | |
| 2047811 | 12/1980 | United Kingdom | 60/39.093 |
| 2136880 | 9/1984 | United Kingdom | 60/39.093 |

Primary Examiner—Donald E. Stout
Attorney, Agent, or Firm—Cushman, Darby & Cushman

[57] ABSTRACT

A geared turbofan gas turbine engine has a fan rotor carrying a plurality of fan blades driven by a gas generator via a gear assembly. A fan casing which has an exterior surface is positioned coaxially with and encloses the fan rotor.

A lubricant supply is provided to lubricate and cool the gear assembly and a heat exchanger is provided to cool the lubricant.

An air scoop forms a first duct which supplies air to the heat exchanger to cool the lubricant. A second duct defined partially by the air scoop downstream of the heat exchanger and an annular chamber formed coaxially supplies air warmed in the fan casing by the heat exchanger to the exterior surface of the fan casing for deicing or anti-icing purposes.

The air scoop and heat exchanger can be positioned on the fan casing, the gas generator casing or a pylon. A valve in the air scoop controls the flow of warmed air to the second duct.

18 Claims, 3 Drawing Sheets

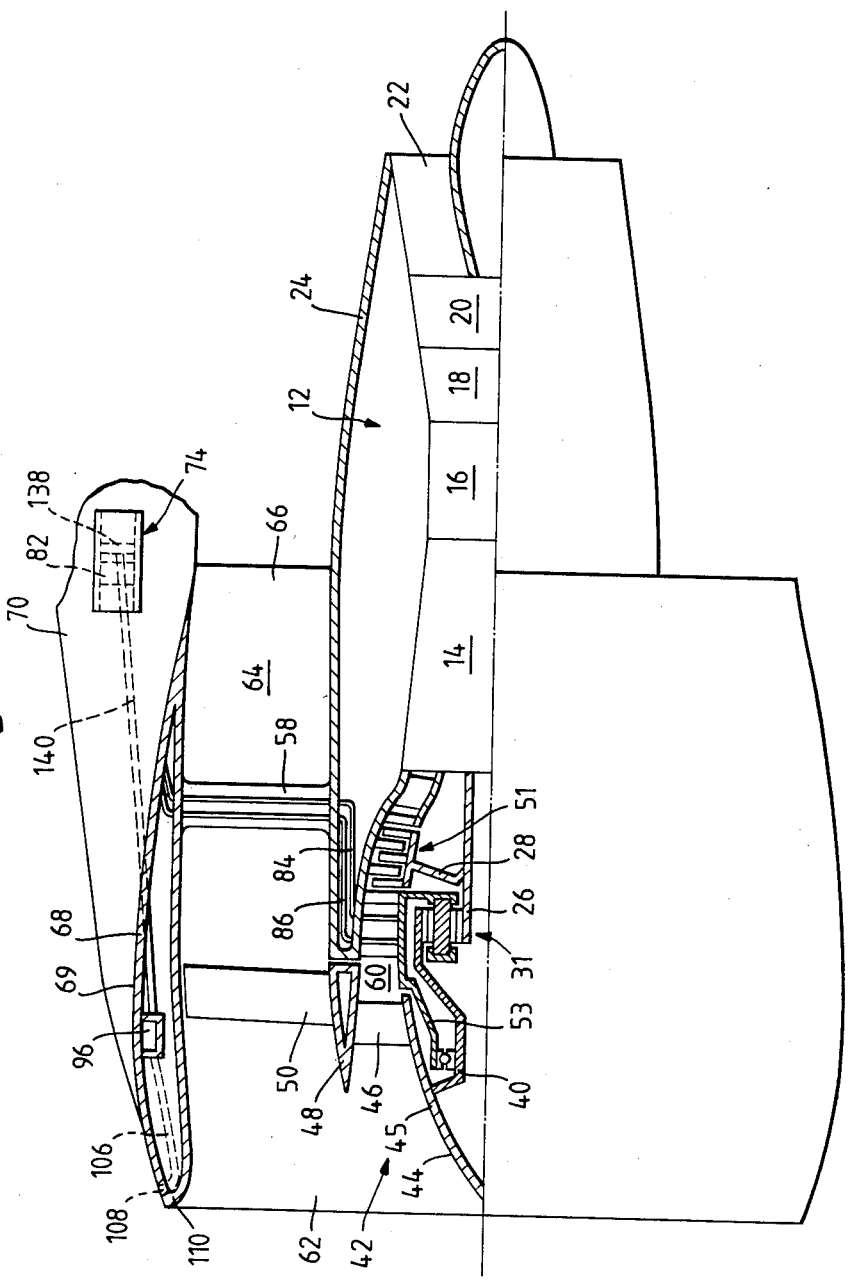

DEICING OF A GEARED GAS TURBINE ENGINE

The present invention relates to geared gas turbine engines and in particular to gas turbine engines in which one or more rotors carrying a plurality of blades is driven by a gas generator via a gear assembly, and is concerned with deicing or anti-icing or a surface of the gas turbine engine.

The casing surfaces of gas turbine engines are de-iced or anti-iced generally by one of three methods, or a combination of two or more of these methods. The first method bleeds relatively hot air from a compressor of the gas generator and supplies the relatively hot air via piping to a surface of the casing to be de-iced. The main problem with this method is a reduction in performance of the gas turbine engine. The second method uses electrical heaters which are located in the casing of the gas turbine engine, and the third method uses electrical impulses which are supplied to a device to impact against the casing to throw off ice. The second and third methods produce electromagnetic effects which can interfere with the electronic control systems of the gas turbine engine.

Accordingly the present invention seeks to provide a geared gas turbine engine in which a surface of the gas turbine engine can be de-iced without the above mentioned problems.

Accordingly the present invention provides a geared gas turbine comprising a gas generator, at least one rotor carrying a plurality of blades, the at least one rotor being driven by the gas generator via a gear assembly, a lubricant supply to lubricate and cool the gear assembly, a heat exchanger to cool the lubricant for the gear assembly, a first duct means to supply air to the heat exchanger, a second duct means to supply air warmed by the heat exchanger to a surface of the geared gas turbine engine to be de-iced.

An air scoop may define at least partially the first duct means to convey air from an intake opening to the heat exchanger.

The second duct means may be defined at least partially by the air scoop downstream of the heat exchanger, the second duct means having at least one outlet to direct the warmed air over said surface of the geared gas turbine engine.

The second duct means may comprise an annular chamber, the annular chamber being coaxial with the gas generator, the annular chamber being defined by at least one circumferentially extending wall, the annular chamber being supplied with warmed air from the heat exchanger by the air scoop, a plurality of ducts being secured to and communicating with the annular chamber, each of the ducts having an outlet to direct warmed air over the surface of the geared gas turbine engine.

The air scoop may comprise a valve means, the valve means controls the flow of warmed air from the heat exchanger to the surface of the geared gas turbine engine.

The air scoop may define at least partially a third duct means to convey warmed air from the heat exchanger to an outlet, the valve means comprising a flap pivotally mounted in the air scoop downstream of the heat exchanger, the flap being movable between a first position in which substantially all the warmed air is supplied via the second duct means to the surface of the geared gas turbine engine and a second position in which substantially all the warmed air is supplied to the outlet of the air scoop via the third duct means.

At least one of the plurality of ducts may have an ejector nozzle, the ejector nozzle being supplied with a fluid and injecting the fluid into the duct to induce a flow of warmed air through the second duct means.

A geared turbofan gas turbine engine comprising a gas generator, at least one fan rotor carrying a plurality of fan blades, the at least one fan rotor being driven by the gas generator via a gear assembly, a fan casing being positioned coaxially with and enclosing the fan rotor and fan blades, a lubricant supply to lubricate and cool the gear assembly, a heat exchanger to cool the lubricant for the gear assembly, a first duct means to supply air to the heat exchanger, a second duct means to supply air warmed by the heat exchanger to an exterior surface of the fan casing to be de-iced, An air scoop may define at least partially the first duct means to convey air from an intake opening to the heat exchanger.

The second duct means may be defined at least partially by the air scoop downstream of the heat exchanger, the second duct means comprising an annular chamber positioned coaxially within the fan casing, the annular chamber being defined by at least one circumferentially extending wall, the annular chamber being supplied with warmed air from the heat exchanger by the air scoop, a plurality of ducts being secured to and communicating with the annular chamber, each of the ducts having an outlet to direct warmed air over the exterior surface of the fan casing.

Each of the ducts may extend in an upstream direction to the upstream end of the fan casing, the outlet of each of the ducts directs the warmed air in a downstream direction over the exterior surface of the fan casing.

The outlet of each duct may diverge circumferentially.

The air scoop may comprise a valve means, the valve means controls the flow of warmed air from the heat exchanger to the exterior surface of the fan casing.

The air scoop may define at least partially a third duct means to convey warmed air from the heat exchanger to an outlet, the valve means comprising a flap pivotally mounted in the air scoop downstream of the heat exchanger, the flap being movable between a first position in which substantially all the warmed air is supplied via the second duct means to the exterior surface of the fan casing and a second position in which substantially all the warmed air is supplied to the outlet of the air scoop via the third duct means.

At least one of the plurality of ducts may have an ejector nozzle, the ejector nozzle being supplied with a fluid and injecting the fluid into the duct to induce a flow of warmed air through the second duct means.

The air scoop may be positioned on the fan casing, the air scoop projecting substantially radially from the fan casing, the heat exchanger being positioned radially between the air scoop and the fan casing.

The fan casing may have an aperture, the aperture supplying warmed air from the air scoop downstream of the heat exchanger to the annular chamber.

The annular chamber may be defined by a circumferentially extending upstream wall, a circumferentially extending downstream wall, a circumferentially extending radially inner wall and a circumferentially extending radially outer wall, the fan casing forming the circumferentially extending radially outer wall.

The air scoop may be positioned on a gas generator casing, the air scoop projecting substantially radially fromt he gas generator casing, the heat exchanger being positioned radially between the air scoop and the gas generator casing.

The gas generator casing may have an aperture, the aperture supplying warmed air from the air scoop downstream of the heat exchanger to the annular chamber.

The geared turbofan gas turbine engine may be mounted onto an associated aircraft by a pylon, the air scoop being positioned on the pylon, the air scoop projecting from the pylon and the heat exchanger being positioned between the air scoop and the pylon.

The present invention will be more fully described by way of example with reference to the accompanying drawings, in which:

FIG. 6 is a partially cut away view of a geared turbofan gas turbine engine according to the present invention showing a third deicing arrangement.

Figure 1:
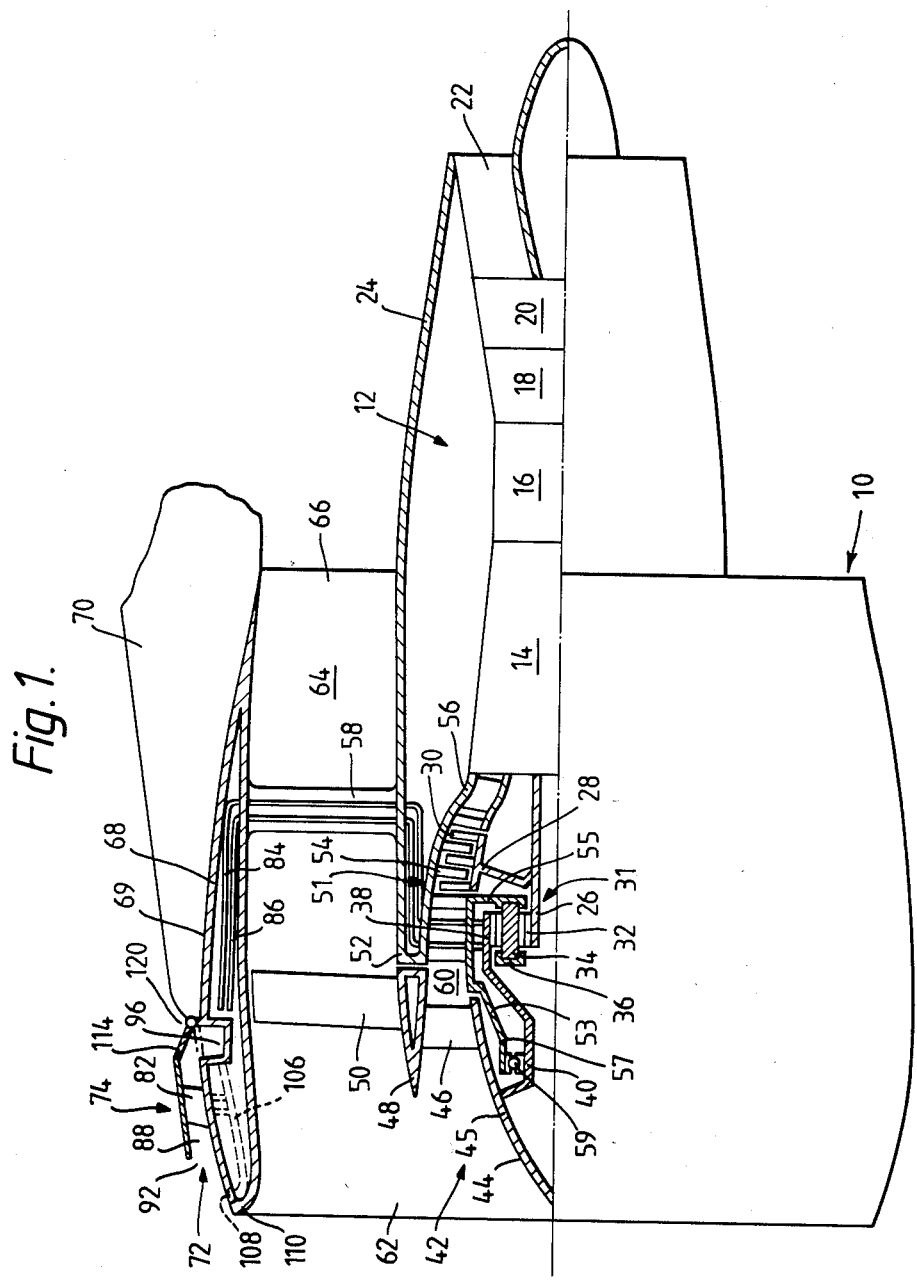
FIG. 1 is a partially cut-away view of a geared turbofan gas turbine engine according to the present invention showing the deicing arrangement.

A geared turbofan gas turbine engine 10 is shown in FIG. 1, and comprises a gas generator 12, a gear assembly 31, a fan assembly 42 and a booster compressor 51.

The gas generator 12 comprises an axial flow series a compressor section 14, a combustor 16, a first turbine section 18, a second turbine section 20 and an exhaust 22, and the gas generator 12 is enclosed by a coaxial gas generator casing 24. The gas generator operates quite conventionally in that air is compressed as it flows through the compressor 14, and the compressed air is supplied to the combustor 16. Fuel is injected into the combustor 16, and is burnt in the air to produce hot gases. The hot gases flow through and drive the first and second turbines 18 and 20 respectively, the hot gases then flow through the exhaust 22 to atmosphere. The first turbine 18 is drivingly connected to the compressor 14 via a shaft (not shown), and the second turbine 20 is drivingly connected to the gear assembly 31 via a shaft 26.

The compressor section 14 may comprise a single compressor or an intermediate and a high pressure compressor, likewise the first turbine 18 may comprise a single turbine or a high pressure and an intermediate pressure turbine to match.

The fan assembly 42 is positioned upstream of the gas generator 12, and comprises a rotor 44. The rotor 44 comprises a tapering spinner 45, a coaxial ring structure 48 and a plurality of vanes 46. The vanes 46 extend radially between, and are secured to the spinner 45 and the ring structure 48. A plurality of fan blades 50 are arranged circumferentially on the ring structure 48, and each fan blade 50 is removably secured to the ring structure 48, and is of the variable pitch type.

The booster compressor 51 is positioned axially between the fan assembly 42 and the gas generator 12, and comprises a rotor 28 and a stator casing 56. The rotor 28 has a number of stages, three in this example, of blades 30. The blades 30 in each stage are arranged circumferentially and extend radially outwardly from the rotor 28. The rotor 28 is connected to the shaft 26 so as to be driven by the second turbine 20. The stator casing 56 has a number of stages of vanes 54, the vanes 54 in each stage are arranged circumferentially and extend radially inwardly from the stator casing 56. The rotor 28 and stator casing 56 are coaxial and the stator casing 56 encloses the rotor 28. The vanes 54 may be variable stator vanes.

The gear assembly 31 comprises a sun gear 32 which is integral with, or secured to, the shaft 26, a plurality of planet gears 34 rotatably mounted in a planet carrier 36 and an annulus gear 38. The planet gears 34 mesh with, and are driven by the sun gear 32, and the annulus gear 38 meshes with, and is driven by the plane gears 34. The annulus gear 38 is integral with, or is secured to a shaft 40, and the shaft 40 is drivingly connected to the spinner 45, to drive the fan assembly 42.

The stator casing 56 is secured at its upstream end to the gas generator casing 24, and also the upstream end of the stator casing 56 has a plurality of struts, or vanes, 52 which extend radially inwardly and are secured to a support structure 53. The support structure 53 comprises a substantially conical member 57, which extends in an upstream direction from the struts 52. The conical member 57 is coaxial with, and surrounds, the shaft 40, and the shaft 40 and fan assembly 42 are rotatably mounted on the conical member 57 by a bearing 59. The support structure 53 also comprises a member 55 which is secured to the planet carrier 36. The stator casing 56 and the ring structure 48 define an outer boundary of an annular flow passage 60 to the gas generator 12, and the spinner 45, support structure 53 and rotor 28 define an inner boundary of the annular flow passage 60.

The fan assembly 42 rotates within a fan duct 64 defined by a fan casing 68, and the fan casing 68 is secured to the gas generator casing 24 by a plurality of circumferentially arranged radially extending struts 58. The fan duct 64 has an inlet 62 at its upstream end and an outlet 66 at its downstream end.

The turbofan gas turbine engine is secured to an associated aircraft structure by a pylon 70 which is secured to the fan casing 68 by a mounting arrangement (not shown).

Figure 2:
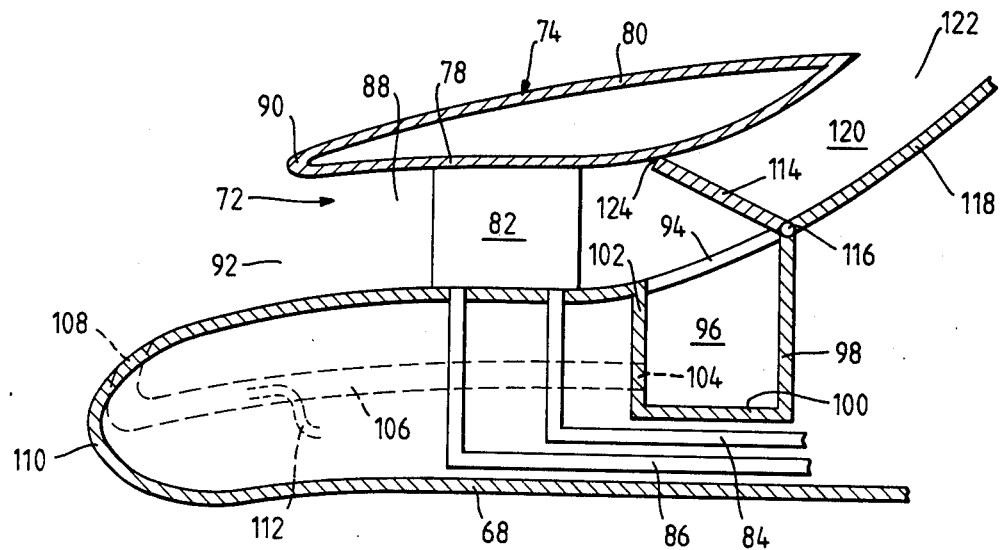
FIG. 2 is an enlarged cross-sectional view of the deicing arrangement shown in FIG. 1.
Figure 3:
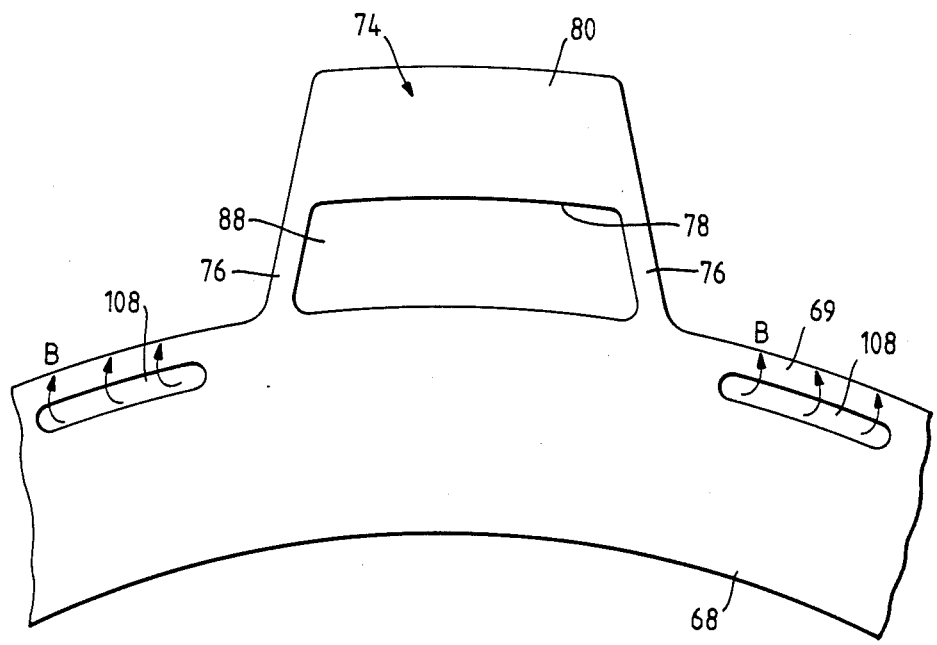
FIG. 3 is a view looking along arrow A in FIG. 2.
Figure 4:
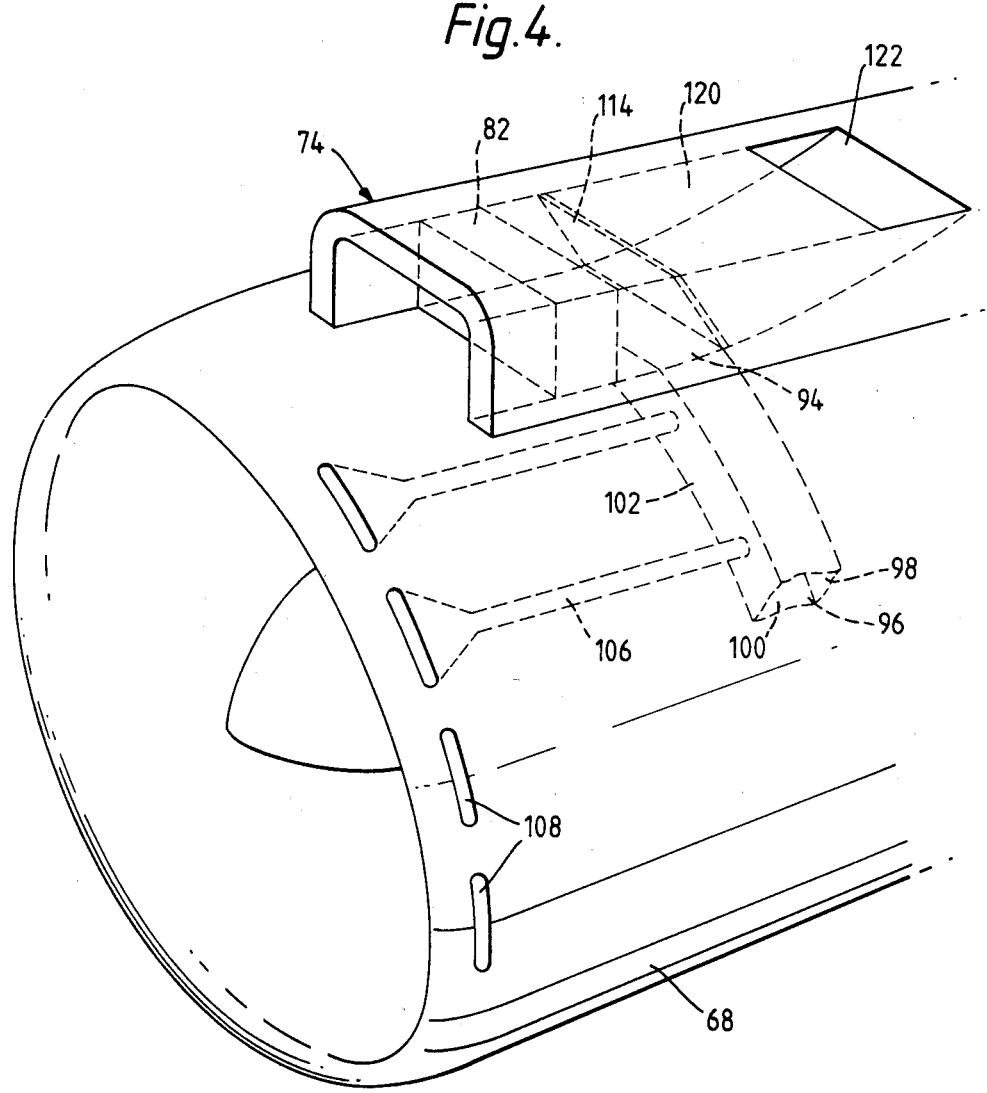
FIG. 4 is a pictorial part view of the geared turbofan gas turbine engine in FIG. 1 showing the deicing arrangement.

A de-icing arrangement 72 for an outer surface 69 of the fan casing 68 is shown more clearly in FIGS. 2,3 and 4. The deicing arrangement 72 comprises an air scoop 74 which projects radially outwards from the fan casing 68, the air scoop 74 comprises a pair of circumferentially spaced sidewalls 76, which extend substantially radially from the fan casing 68, a radially inner wall 78 and a radially outer wall 80. The radially inner wall 78 and radially outer wall 80 are secured to or are formed integral with the sidewalls 76. A heat exchanger 82 is positioned in the air scoop 74 radially between the inner wall 78 and the fan casing 68. The heat exchanger 82 is supplied with relatively hot lubricant, oil, from the gear assembly 31 via a pipe 84, and cooled lubricant is returned to the gear assembly 31 via a pipe 86. The pipes 84 and 86 extend through the struts 58, and extend within the gas generator casing 24 and through the struts 52, between the heat exchanger 82 and the gear assembly 31.

The radially inner wall 78 and the sidewalls 76 of the air scoop 74 together with the fan casing 68 upstream of the heat exchanger 82 define a first duct 88 of an air intake which has an intake opening 92 at the upstream end 90 of the air scoop 74. The first duct 88 supplies cooling air to the heat exchanger 82, to cool the lubricant supplied to the heat exchanger 82 from the gear assembly 31.

The fan casing 68 has an aperture 94 downstream of the heat exchanger 82, and an annular chamber 96 is formed within the fan casing 68 coaxially with the axis of the fan casing 68. The annular chamber 96 is defined by a circumferentially extending downstream wall 98, a circumferentially extending upstream wall 102, a circumferentially extending radially inner wall 100 and a circumferentially extending radially outer wall, which for example is the fan casing 68. The annular chamber 96 could also be formed by a tubular circumferentially extending wall. The aperture 94 allows cooling air warmed by its passage through the heat exchanger 82 to flow from the air scoop downstream of the heat exchanger into the annular chamber 96. The upstream wall 102 has a plurality of circumferentially spaced apertures 104, and each aperture 104 communicates with a respective duct 106, the ducts 106 are secured to the upstream wall 102 and extend in an upstream direction towards the upstream end 110 of the fan casing 68. The ducts 106 have outlets 108 at their upstream ends, the outlets 108 are arranged to direct warmed air over the external surface 69 of the casing 68 for de-icing or anti-icing. The upstream ends of the ducts 106 are preferably divergent, or fanned circumferentially to form circumferentially extending outlet slots 108, and they direct the air in a downstream direction. The ducts 106 are provided with ejector nozzle 112, which can be supplied with fluid, i.e. high pressure air from the compressor, to induce a flow through the ducts 106. The radially inner wall 78 and sidewalls 76 of the air scoop 74 and the fan casing immediately downstream of the heat exchanger 82, the opening 94, annular chamber 96 and ducts 106 form a second duct arrangement to supply cooling air warmed by the heat exchanger to a surface of the fan casing to be de-iced as shown by arrows B in FIG. 3.

The radially inner wall 78 and the sidewalls 76 of the air scoops 74 together with a wall 118, downstream of the heat exchanger 82, define a third duct 120. The third duct 120 has an outlet 122 at its downstream end to dump warmed air from the heat exchanger 82 overboard to atmosphere. The wall 118 and the wall 98 are joined together.

A control valve comprises a flap 114 which is pivotally mounted by a pivot 116 at the junction of the walls 98 and 118. The flap 114 controls the flow of warmed air from the heat exchanger. The flap is movable between two positions, in the first position the flap 114 is arranged so that its free end 124 remote from the pivot 116, abuts the inner wall 78 of the air scoop 74 to block the third duct 120 to direct the warmed air through the second duct, as shown in FIG. 2, and in the second position the flap 114 closes the aperture 94 to block the second duct to direct the warmed air through the third duct.

The air scoop 74 is formed at the upstream end of the pylon 70, and the downstream end of the air scoop 74 blends smoothly into the pylon.

In operation of the geared turbofan gas turbine engine, heat is produced by the gear assembly in driving the fan assembly, and the heat is carried by the lubricant to the heat exchanger. The heat exchanger cools the lubricant and the cooled lubricant is returned to the gear assembly.

The air scoop supplies cooling air to the heat exchanger so as to cool the lubricant, the cooling air is warmed as it flows through the heat exchanger. The flap of the control valve is positioned in the second position to allow the warmed cooling air to flow through the third duct to atmosphere when de-icing or anti-icing is not required. However, when it is necessary to de-ice or anti-ice the fan casing external surface, the flap of the control valve is moved to the first position to allow the warmed cooling air to flow through the second duct and be directed to flow over the external surface of the fan casing for de-icing or anti-icing of the external surface of the fan casing. The ejector nozzle is used to induce a flow through the second duct, when de-icing or anti-icing of the external surface of the fan casing is required and the aircraft upon which the gas turbine engine is mounted is static, because there is no ram air flow into the air scoop.

This arrangement is most applicable to high bypass ratio geared turbofan gas turbine engines. In high bypass ratio turbofan gas turbine engines the fan casing has a relatively large circumference and hence a relatively large external surface. In order to de-ice or anti-ice a fan casing of a high bypass ratio turbofan gas turbine engine using the forementioned methods relatively large amounts of air would have to be bled from the compressore of the gas generator further reducing the performance of the gas turbine engine, or relatively large amounts of electrical power would be required causing further risk of interference with the gas turbine engine electronic controls, and requiring electrical generators of increased power rating.

A geared turbofan gas turbine engine of relatively high bypass ratio, for example of the order of 17.5 to 1, and a gear assembly of the order of 20,000 Horse Power (HP) or 15 MW will generate, at 98.5% efficiency of power transmission, 300 HP or 220 KW of heat which is passed into the lubricant and which is normally wasted by passing it to atmosphere.

Figure 5:
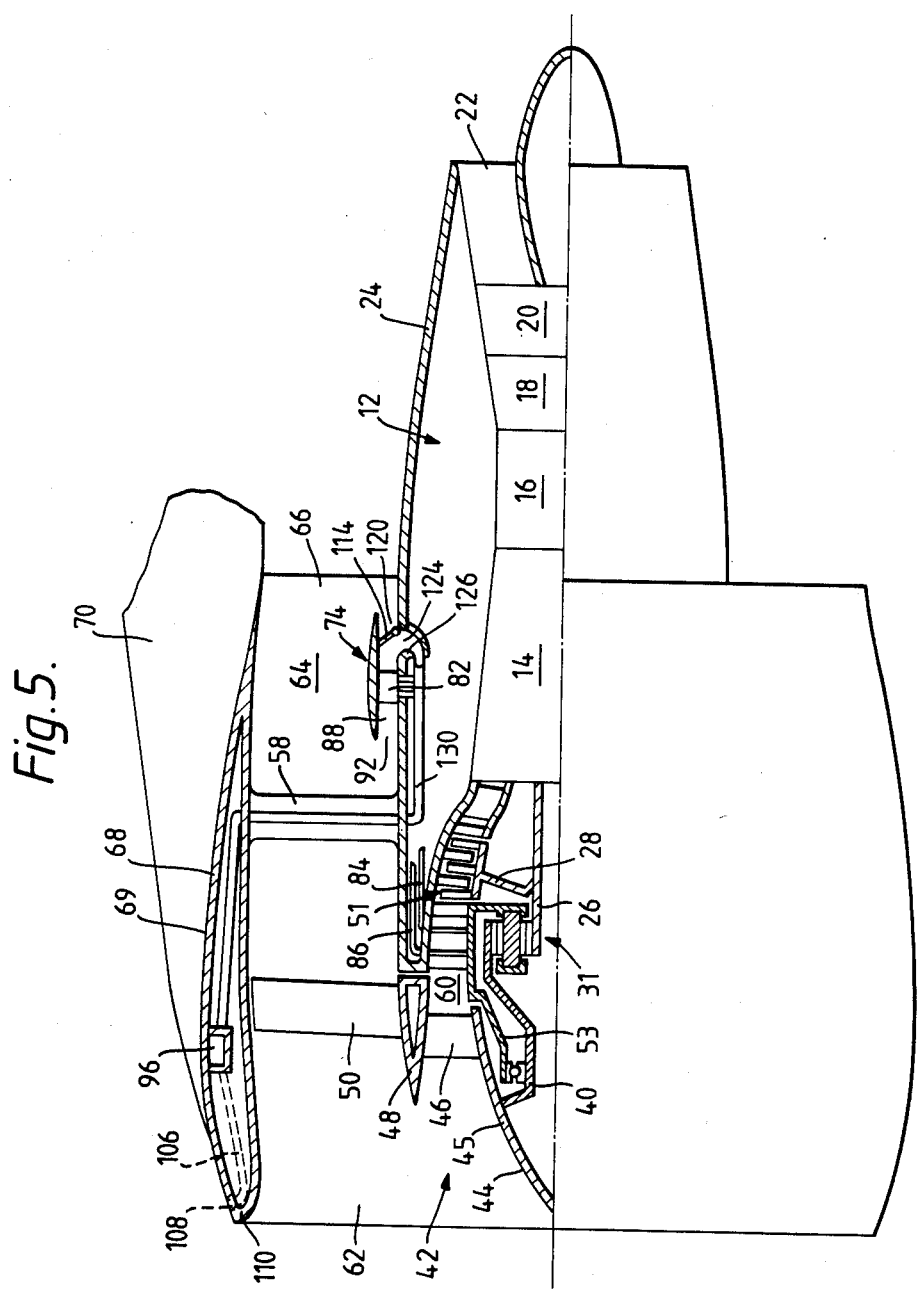
FIG. 5 is a partially cut-away view of a geared turbofan gas turbine engine according to the presnet invention showing a second deicing arrangement.

An alternative embodiment of de-icing arrangement is shown in FIG. 5. The de-icing arrangement is substantially the same as that shown in FIGS. 1 to 4, but the air scoop 74 projects radially outwards from the gas generator casing 24. The heat exchanger 82 is positioned in the air scoop 74 radially between the inner wall of the air scoop and the gas generator casing 24. The air scoop 74 is positioned within the fan duct 64. The pipes 84 and 86 which supply and return lubricant to and from the heat exchanger 82 are much shorter as they do not extend through a strut 58 in this embodiment.

The gas generator casing 24 has an aperture 124 downstream of the heat exchanger 82, and a chamber 126 is formed by a wall 128. A pipe 130 interconnects the chamber 126 with the annular chamber 96 in the fan casing 68 to allow cooling air warmed by the heat exchanger 82 to flow into the chamber 126 and via pipe 130, which extends through a strut 58, to the annular chamber 96 so as to direct air over the external surface of the fan casing for de-icing or anti-icing thereof. The chamber 126, pipe 130, annular chamber 96 and pipes 106 form the second duct. The third duct 120 dumps unwanted cooling air into the fan duct after cooling the lubricant in the heat exchanger, and a flap 114 is provided to control the flow of cooling air to the second duct or third duct.

A third embodiment of de-icing arrangement is shown in FIG. 6. The de-icing arrangement is substantially the same as that shown in FIGS. 1 to 4, but the air scoop 74 projects outwards from the pylon 70. The heat exchanger 82 is positioned in the air scoop 74 between the inner wall of the air scoop and the pylon 70. The pipes 84 and 86 which supply and return lubricant to and from the heat exchanger 82 extend into the pylon 70 from the fan casing 68.

The pylon 70 is provided with an aperture 138 downstream of the heat exchanger 82 and this is interconnected with the annular chamber 96 in the fan casing 68 by a pipe 140 to allow cooling air warmed by the heat exchanger to flow to the annular chamber 96 so as to be directed over the external surface of the fan casing for de-icing purposes. The pipe 140, annular chamber 96 and ducts 106 form the second duct. A flap is again provided to control the flow of cooling air through the second and third ducts.

All three embodiments function in substantially the same manner. The first and third embodiments have their air scoops positioned on the fan casing and pylon respectively, and they take in ambient air at a relatively low pressure, and these have relatively short lengths of duct for conveying air for de-icing purposes. The second embodiment has the air scoop positioned on the gas generator casing and takes in fan delivery air at a relatively higher pressure which is more beneficial for cooling the lubricant, but has relatively long lengths of duct for conveying air for de-icing purposes.

Although the description and drawings have referred to a geared turbofan gas turbine engine, the invention is also applicable to a geared turbopropeller gas turbine engine, and in such an arrangement the air scoop would be positioned on the gas generator casing and the air would be supplied to de-ice the gas generator casing or other surface.

I claim:

1. A geared gas turbine engine comprising a gas generator, at least one rotor carrying a plurality of blades, a gear assembly, a surface to be deiced,
    the at least one rotor being driven by the gas generator via the gear assembly,
    a lubricant supply to lubricate and cool the gear assembly,
    a heat exchanger to cool the lubricant for the gear assembly,
    an air scoop having an upstream end and a downstream end, the upstream end of the air scoop forming an intake opening, the downstream end of the air scoop forming an outlet opening,
    the air scoop including a first duct means downstream of the heat exchanger, said first duct means supplying air warmed by the heat exchanger to said surface of the geared gas turbine engine to be deiced,
    the air scoop including a second duct means to convey air warmed by the heat exchanger to the outlet opening,
    a valve means mounted in the air scoop downstream of the heat exchanger, the valve means having a first position and a second position, the valve means being movable between the first position in which substantially all the warmed air is supplied via said first duct means to said surface of the geared gas turbine engine and the second position in which substantially all the warmed air is supplied via said second duct means to the outlet at the downstream end of the air scoop.

2. A geared gas turbine engine as claimed in claim 1 in which the first duct means is defined at least partially by the air scoop downstream of the heat exchanger, the first duct means having at least one outlet to direct the warmed air over said surface of the geared gas turbine engine.

3. A geared gas turbine engine as claimed in claim 2 in which the first duct means comprises an annular chamber, the annular chamber being coaxial with the gas generator, the annular chamber being defined by at least one circumferentially extending wall,
    the annular chamber being supplied with warmed air from the heat exchanger by the air scoop,
    a plurality of ducts being secured to and communicating with the annular chamber, each of said ducts having an outlet to direct warmed air over said surface of the geared gas turbine engine.

4. A geared gas turbine engine as claimed in claim 1 in which the air scoop has an outlet at its downstream end, the air scoop defining at least partially a third duct means to convey warmed air from the heat exchanger to the outlet,
    the valve means comprising a flap pivotally mounted in the air scoop downstream of the heat exchanger, the flap having a first position and a second position, the flap being movable between the first position in which substantially all the warmed air is supplied via the second duct means to said surface of the geared gas turbine engine and the second position in which substantially all the warmed air is supplied to the outlet at the downstream end of the air scoop via the third duct means.

5. A geared gas turbine engine as claimed in claim 3 in which at least one of the plurality of ducts has an ejector nozzle, the ejector nozzle being supplied with fluid and adapted to inject fluid into the duct to induce a flow of warmed air through the second duct means.

6. A geared turbofan gas turbine engine comprising a gas generator, at least one fan rotor carrying a plurality of fan blades, a fan casing, a gear assembly,
    the fan casing having an upstream end and an exterior surface, the fan casing being positioned coaxially with and enclosing the fan rotor and fan blades,
    the at least one fan rotor being driven by the gas generator via the gear assembly,
    a lubricant supply to lubricate and cool the gear assembly,
    a heat exchanger to cool the lubricant for the gear assembly,
    an air scoop having an upstream end and a downstream end, the upstream end of the air scoop forming an intake opening, the downstream end of the air scoop forming an outlet opening,
    the air scoop including a first duct means, the first duct means supplying air from the intake opening to the heat exchanger,
    the air scoop including a second duct means downstream of the heat exchanger, the second duct means supplying air warmed by the heat exchanger to the exterior surface of the fan casing to deice said exterior surface,
    the air scoop including a third duct means to supply air warmed by the heat exchanger to the outlet opening,
    a valve means mounted in the air scoop downstream of the heat exchanger, the valve means having a first position and a second position, the valve means being movable between the first position in which substantially all the warmed air is supplied via the second duct means to said exterior surface of the fan casing and the second position in which substantially all the warmed air is supplied via the third duct means to the outlet opening at the downstream end of the air scoop.

7. The invention as claimed in claim 6 wherein said valve means comprises a flap movable between said first and said second positions, said flap being pivotally mounted in said air scoop.

8. A geared turbofan gas turbine engine as claimed in claim 6 in which the second duct means is defined at least partially by the air scoop downstream of the heat exchanger, the second duct means comprises an annular chamber, the annular chamber being positioned coaxially within the fan casing, the annular chamber being defined by at least one circumferentially extending wall, the annular chamber being supplied with warmed air from the heat exchanger by the air scoop, a plurality of ducts being secured to and communicating with the annular chamber, each of said ducts having an outlet to direct warmed air over said exterior surface of the fan casing.

9. A geared turbofan gas turbine engine as claimed in claim 8 in which each of said ducts extends in an upstream direction to the upstream end of the fan casing, the outlet of each of said ducts being adapted to direct the warmed air in a downstream direction over the exterior surface of the fan casing.

10. A geared turbofan gas turbine engine as claimed in claim 9 in which the outlet of each of said ducts diverges circumferentially.

11. A geared turbofan gas turbine engine as claimed in claim 8 in which the air scoop comprises a valve means, the valve means being adapted to control the flow of warmed air from the heat exchanger to said exterior surface of the fan casing.

12. A geared turbofan gas turbine engine as claimed in claim 8 in which at least one of the plurality of ducts has an ejector nozzle, the at least one ejector nozzle being supplied with fluid and adapted to inject fluid into the duct to induce a flow of warmed air through the second duct means.

13. A geared turbofan gas turbine engine as claimed in claim 8 in which the air scoop is positioned on the fan casing, the air scoop projecting substantially radially from the fan casing, the heat exchanger being positioned radially between the air scoop and the fan casing.

14. A geared turbofan gas turbine engine as claimed in claim 13 in which the fan casing has an aperture, the aperture supplying warmed air from the air scoop downstream of the heat exchanger to the annular chamber.

15. A geared turbofan gas turbine engine as claimed in claim 14 in which the annular chamber is defined by a circumferentially extending upstream wall, a circumferentially extending downstream wall, a circumferentially extending radially inner wall and a circumferentially extending radially outer wall, the fan casing forming the circumferentially extending radially outer wall.

16. A geared turbofan gas turbine engine as claimed in claim 8 in which the gas generator has a gas generator casing, the air scoop being positioned on the gas generator casing, the air scoop projecting substantially radially from the gas generator casing, the heat exchanger being positioned radially between the air scoop and the gas generator casing.

17. A geared turbofan gas turbine engine as claimed in claim 16 in which the gas generator casing has an aperture, the aperture supplying warmed air from the air scoop downstream of the heat exchanger to the annular chamber.

18. A geared turbofan gas turbine engine as claimed in claim 8 in which the geared turbofan gas turbine engine is mounted onto an associated aircraft by a pylon, the air scoop being positioned on the pylon, the air scoop projecting from the pylon and the heat exchanger being positioned between the air scoop and the pylon.

* * * * *